Figure 1:
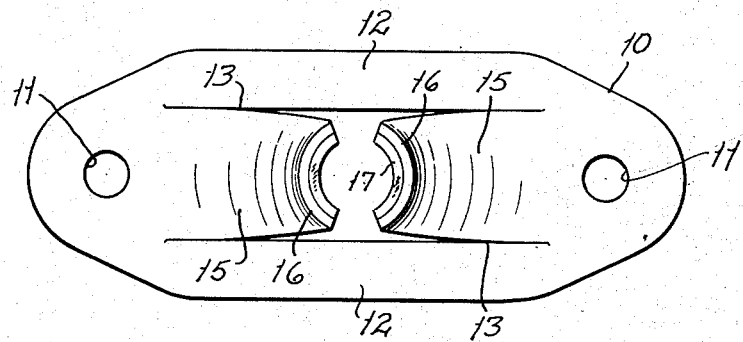

June 4, 1946.  G. A. TINNERMAN  2,401,672
FASTENING DEVICE
Filed June 29, 1942

INVENTOR.
George A. Tinnerman
BY
Bates, Teare & McBean
Attorneys

Patented June 4, 1946

2,401,672

UNITED STATES PATENT OFFICE 2,401,672

FASTENING DEVICE

George A. Tinnerman, Cleveland, Ohio, assignor to Tinnerman Products, Inc., Cleveland, Ohio, a corporation of Ohio Application June 29, 1942, Serial No. 448,943

1 Claim. (Cl. 85—32)

This invention relates to a fastening device provided by a plate having integral upturned arcuate lugs inwardly grooved so that the two lugs provide a helical thread to engage the thread of a bolt for a plurality of turns.

One of the objects of my invention is to carry the arcuate threaded lugs in a resilient manner so that they may be swung inwardly and pulled down by the applied bolt to act not only as a nut therefor, but as a spring lock applying continuous tension to the bolt and thus forming their own nut lock. The lugs are thus self-energizing and retain their resilient action indefinitely, so that the bolt may be removed whenever desired and a bolt supplied subsequently with the same locking action.

Another object of the invention is to provide such fastening device in a form having a flat base adapted for permanent attachment to a plate or support, the tongues inclining from such base and resiliently carrying the threaded lugs.

Another object is to so form the tongues that there will be no danger of their flexing adjacent to the lugs, with the danger of a permanent set when the device has been applied, but, on the contrary, insuring the flexing from a region considerably distant from the lugs and thus maintaining the resiliency.

Another object of the invention is to so devise the various parts of the fastener that the lugs may be readily drawn from the tongue portions of the blank and sufficient metal will be available for the formation of properly grooved lugs without requiring undue thickness of the plate.

In carrying out my invention, I provide a flat plate adapted for permanent mounting on a support, and I form in the plate a pair of parallel slits with a transverse opening between them, and I bend the two tongues left between these slits upwardly at oblique angles to the base and I bend arcuate lugs upwardly from the end portions of the tongues at oblique angles to the tongues. These arcuate lugs are inwardly threaded and thus form a nut while the spring tongues carrying them serve to self-energize them to cause them to maintain a constant tension on the bolt. The result is that after the plate is applied to its support the self-energizing nut is always available to receive the bolt and lock it and at the same time allows removal of the bolt whenever desired and then is ready for the application of a subsequent bolt.

In effecting the resilient support of the arcuate lugs I arch the tongues or curve them transversely, with the result that the flexing of the tongues as the lugs are drawn inwardly takes place at the root of the tongues, that is, at the junction with their flat base. By this means, a comparatively long arm is provided supporting the arcuate lug and insuring resiliency. There is no danger of a permanent set at the first application, which might take place if the tongue flexed adjacent the lug. The arching of the tongues also has the advantage that the arcuate lugs are more readily drawn from the adjacent metal.

Figure 2:
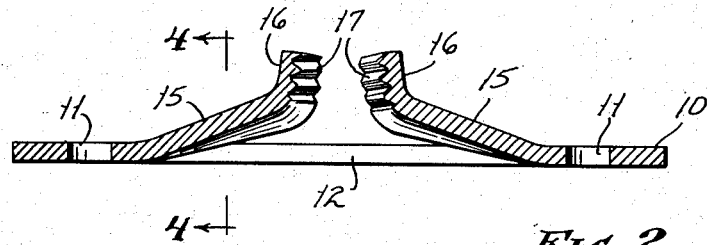
Figure 3:
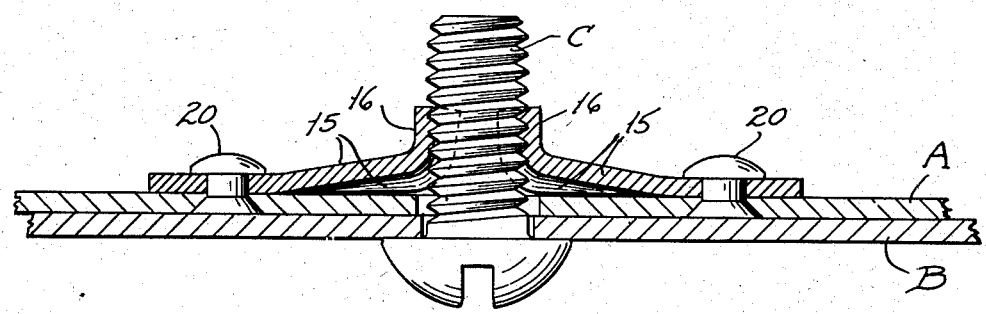
Figure 4:
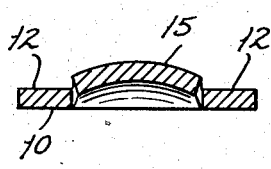

In the drawing:

Fig. 1 is a plan of one form of my fastening device; Fig. 2 is a longitudinal central section thereof; Fig. 3 is a section of this fastening device permanently attached to a support and shown with an applied plate secured in place by a screw occupying the thread of the fastener; Fig. 4 is a cross section of the fastener, indicated by the line 4—4 on Fig. 2; showing the transversely arched form of the tongue.

As shown in Fig. 3, A indicates a suitable supporting plate and B a plate adapted to be attached thereto. My fastener comprises a flat elongated plate 10, shown as having openings 11 through it for the reception of rivets 20 by which the plate is secured to the supporting plate A.

In the intermediate region of the plate 10 between its side zones 12, I cut a pair of parallel slits 13, and between these slits I form a central opening extending transversely from one slit to the other. This leaves a pair of opposed tongues 15 between the slits. The ends of these tongues are bent up in the form of arcuate lugs 16 which extend slightly toward each other and are internally threaded by inclined ribs and grooves on each lug forming in effect a continuous helix 17, part on one lug and part on the other.

The tongues are arched upwardly transversely as indicated in Fig. 4 from the root of the lug nearly to the root of the tongue, such arch being flattened as the tongue merges with the base. It results from this that the two arcuate lugs which provide a helical thread to receive the bolt, are resiliently carried.

The transverse arching of the tongues restricts the flexing of the tongue to a region at its junction with the plate 10. This gives a long arm carrying the threaded lug, insuring resiliency in the action. There is no chance for the tongue to be bent in some intermediate region, which might result in a permanent set of the metal on the first application of the fastener.

I claim:

A fastener comprising an elongated member of sheet metal providing a flat base, a pair of opposed tongues cut from the base by parallel slits with a central space between them, said tongues being bent up to slant normally at oblique angles to the base, the free ends of the tongues being bent up into the form of arcuate lugs, each of which carries a plurality of partial screw threads adapted to coact snugly with a threaded bolt while the tongues remain at an angle to the base, each of said tongues being transversely arched, the arching extending from the curved lug but gradually disappearing at the root of the tongue where it joins the base.

GEORGE A. TINNERMAN.